United States Patent [19]

Uchino

[11] Patent Number: 4,593,283
[45] Date of Patent: Jun. 3, 1986

[54] DATA COMMUNICATION SYSTEM WITH TIMED ACCESS TO LINK

[75] Inventor: Megumi Uchino, Hadano, Japan

[73] Assignee: Hitachi, Ltd., Tokyo, Japan

[21] Appl. No.: 504,489

[22] Filed: Jun. 15, 1983

[30] Foreign Application Priority Data

Jun. 22, 1982 [JP] Japan .................. 57-107293

[51] Int. Cl.$^4$ ............... H04Q 9/00; H04J 3/08
[52] U.S. Cl. ............... 340/825.07; 340/825.1; 370/85
[58] Field of Search .......... 340/825.07, 825.1, 825.52; 371/22, 33, 62; 375/7; 179/175.2 R, 175.2 C, 175.21; 370/85, 90, 91, 100, 108

[56] References Cited

U.S. PATENT DOCUMENTS

4,058,681 11/1977 Imaizumi et al. ................. 370/85
4,156,112 5/1979 Moreland ........................ 370/85
4,354,252 10/1982 Lamb et al. ..................... 375/7

Primary Examiner—Donald J. Yusko
Attorney, Agent, or Firm—Antonelli, Terry & Wands

[57] ABSTRACT

In an on-line system composed of a high rank unit and a plurality of terminal units connected thereto, various causes may produce a time-out in one of the terminal units. When a data link for a terminal unit is not established in a prescribed time resulting in a time-out, the status of the communication line during the attempted data communication is analyzed by a circuit provided for discriminating the cause of the time-out. Using the result of analysis, it is determined whether time-out has resulted from a busy condition of the line so as to diminish undesired work attendant upon occurrence of the time-out as far as possible and for obtaining a system with a high operation rate.

6 Claims, 6 Drawing Figures

DATA COMMUNICATION SYSTEM WITH TIMED ACCESS TO LINK

BACKGROUND OF THE INVENTION

The present invention relates to a data communication system and in particular to processing which is carried out on the occurrence of a time-out in an on-line system having a high rank unit, such as a central computer, and a plurality of terminal units connected to the high rank unit via a communication line.

Such a system is frequently used to process enquiry and renewal operations in the bank window business, inventory management business, railway or aviation seat reservation business or the like. In general, terminal units for inputting enquiries or outputting the processed data are installed at positions which are remote from the central computer for extracting data from various files and updating data. The terminal units are connected to the central computer via a communication line. The input and output data is processed on line.

When the data link for a terminal unit in such a conventional system is not established in a time period defined by the system, although the terminal unit is waiting for the data transmission, the terminal unit interprets that as the occurrence of a time-out, cancels the control status such as the sending of a wait condition, and displays an operator message "line down" on a display device or the like of the terminal unit in order to inform the operator of the occurrence of a time-out and urge the operator to initiate maintenance and investigation of the communication line system.

Causes for the time-out are as follows:

(1) The on-line work of the central computer is being held in abeyance.

(2) The central computer or the terminal unit is out of order.

(3) The power to the modem or branch unit is off.

(4) The communication line including the modem or branch unit is out of order.

(5) A data link between the central computer and another terminal unit is busy.

(6) The on-line program does not start the on-line operation for the terminal unit concerned, but starts the on-line operation for another terminal unit.

For time-outs incurred by causes (1) to (4), it is necessary to carry out maintenance and investigation of the communication line system. Causes (5) and (6) originate from problems existing in the on-line program. Maintenance and investigation for these causes are in fact unnecessary. When time-out occurs in the conventional terminal unit as described before, however, sending wait conditions or the like are cancelled and maintenance and investigation of the communication line system are carried out irrespective of that cause. Thus, the data communication system according to the prior art has the drawback that wasteful maintenance and investigation work are carried out for a time-out incurred by the cause (5) or (6).

SUMMARY OF THE INVENTION

Therefore, an object of the present invention is to provide a data communication system wherein the time required for maintenance and investigation at the occurrence of a time-out is kept as short as possible and the rate of operation is made higher.

Another object of the present invention is to provide a data communication system wherein it is distinguished whether or not another terminal is communicating via the communication and while another terminal unit is communicating, the terminal unit concerned suppresses the cancelling of the sending wait condition. Thus, the retransmission request by the operator becomes unnecessary.

According to the present invention, in the terminal unit of the on-line system for data communication wherein a high rank unit, such as a central computer, and a plurality of terminal units are connected to a single communication line, it is detected and stored whether or not the communication line is operating and the line down processing is suppressed for a stored result indicating that the communication line is operating when time-out has occurred because the data link to the terminal unit concerned is not established in the time defined by the system.

BRIEF DESCRIPTION OF THE DRAWINGS

FIGS. 5a;b show timing diagrams for comparing the operation according to the prior art with that according to the present invention.

DESCRIPTION OF THE PREFERRED EMBODIMENT

Figure 1:
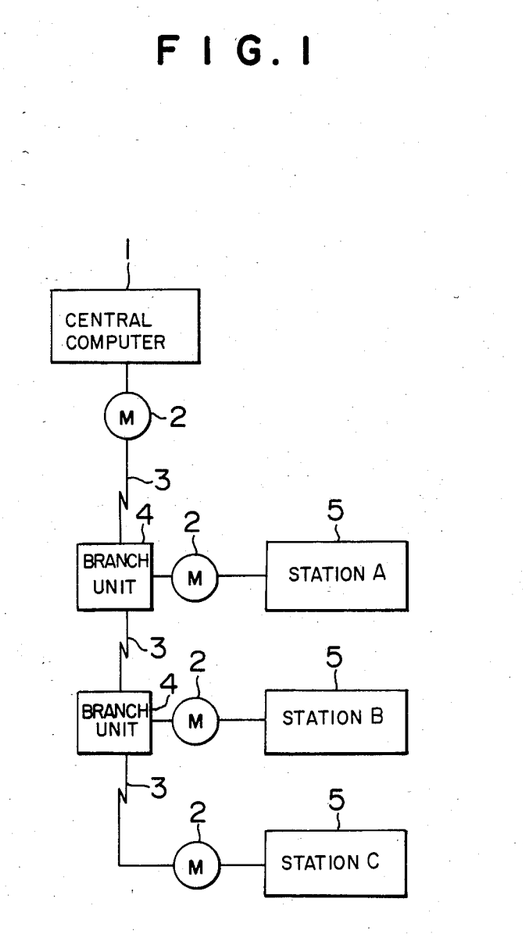
FIG. 1 shows an example of configuration of an on-line data communication system.

FIG. 1 is a block diagram for illustrating the rough construction of a known on-line data communication system to which the present invention may be applied. In FIG. 1, a central computer 1 which is installed at the center and a plurality of terminal units 5 (represented by stations A, B and C for convenience) which are installed at remote positions are connected to a single communication line 3 at multipoints via modem units 2 and branch units 4. The communication line 3 is composed of a receive data line (called an RD line) for transmitting a control signal and data from the central computer 1 to the terminal units 5 and a send data line (called a SD line) for transmitting the information from the terminal units 5 to the central computer 1.

Each of terminal units 5 has one or more devices such as display devices or printers (not illustrated in FIG. 1). A distinct address is given to each terminal unit or each device.

Data communication between the central computer 1 and the terminal units 5 is carried out according to, for example, the known synchronous transmission control procedure. By using the control procedure, a synchronization signal SYN is detected to establish the send-/receive synchronization. That is to say, the central computer 1 issues a transmission character string composed of SYN, SYN, SA, SA, UA, UA and ENQ onto the RD as a service request to the terminal unit 5. Here, SYN (synchronous idle) and ENQ (enquiry character) are known fixed characters for transmission control. The SA is a character for specifying the station address of a terminal unit and the UA is a character for specifying the unit address of a device such as a display device or a printer which is installed within a terminal unit. Depending upon the bit composition in the SA and UA, service requests are classified into a receive request which means that the central computer is ready to receive data from the terminal unit and a send request which means that the central computer is ready to send data to the terminal unit. The former request is called "polling" and the latter request is called "selection". If the central computer 1 issues a polling request onto the RD line and a terminal unit 5 with a station address specified by the SA character has data to be sent to the central computer 1, that terminal unit sends the data onto the SD line. When the terminal unit 5 has completed the data sending or it has not any data to be sent out, the terminal unit 5 sends out an EOT (end of transmission) character. Upon receiving the EOT, the central computer 1 finishes the processing for the terminal unit concerned and then issues a polling request to another terminal unit. The order of terminal units to which pollings are issued is prescribed in the system by the on-line program in the central computer. For instance, if the online program uses a polling table and the polling table defines the order of stations A, B, A and C, the order of issued pollings is repeated as A→B→A→C→A→B→A→C→— .

When the central computer 1 is to send a result of processing toward the terminal unit concerned, the central computer 1 issues a selection request toward the terminal unit concerned and then sends the processed result. Upon finishing the data transmission, the central computer 1 sends an EOT character. For the terminal unit, reception of the polling or selection request is called data link establishment, and sending or reception of the EOT is called data link completion.

Figure 2:
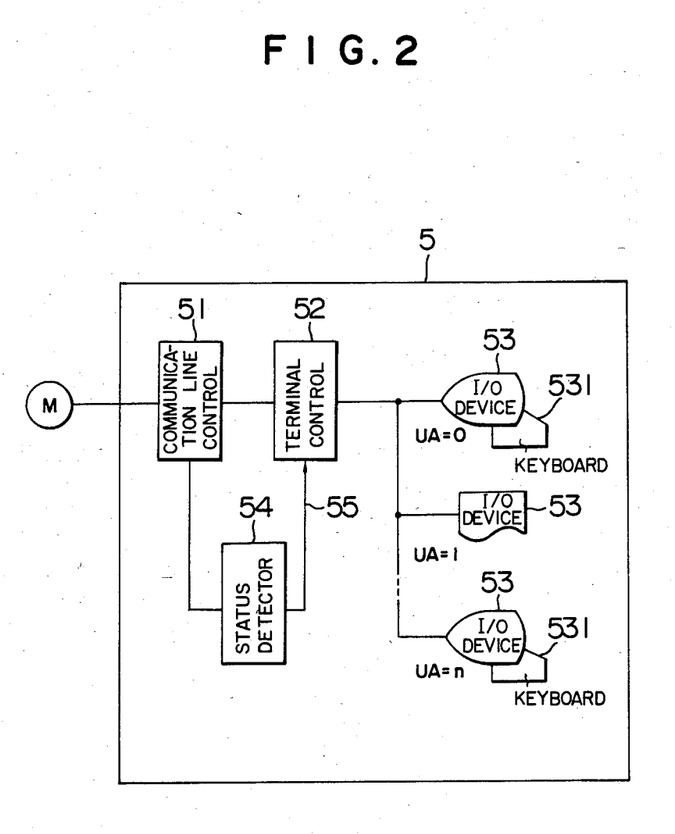
FIG. 2 is a block diagram of an embodiment of a terminal unit according to the present invention.

FIG. 2 shows a block diagram of a terminal unit which is an embodiment of the present invention. In FIG. 2, the terminal unit 5 is composed of a communication line control 51, a terminal control 52, a plurality of I/O devices 53 such as display devices and printer devices including keyboards 531, and a status detector 54. The status detector 54 is especially significant according to the present invention.

To the terminal control 52, a plurality of I/O devices 53 are connected through a coaxial cable. This terminal control 52 issues an operation instruction called a command toward the I/O device 53 to control it for data display, printing and data reading. There are commands for internal polling, program storing, data display, data reading, print control, operator message display and so on.

Usually, the terminal control 52 successively issues internal pollings to I/O devices 53 having unit addresses UA=0 to n and manages the states of the I/O devices 53 depending upon the status codes returned from the I/O devices 53. Assuming now that the operator depresses the send key on the keyboard 531 of the I/O device 53 having the unit address UA=0, for example, the I/O device 53 with UA=0 returns the status code which indicates that the send key is being depressed in reply to internal polling to the address of UA=0. Thereby, the terminal control 52 regards the I/O device 53 with UA=0 as waiting for sending. If in this state the communication line control 51 receives a polling from the central computer 1, the terminal control 52 issues the data read command to the I/O device 53 with UA=0 and stores the data returned from the I/O device 53 into a temporary buffer (not illustrated). The data is edited by adding a control code STX indicating the beginning of the data, station address SA, unit address UA, and a control code ETX indicating the end of the data. The edited data is sent to the central computer 1 via the communication line 3 by the communication line control 51.

The status detector 54 takes in the data transmitted over the communication line through the communication line control 51. If the data link for its own station is not obtained within the prescribed time resulting in time-out, the status detector 54 discriminates whether the time-out is caused by a line-down failure or by communication of another station and outputs a status signal 55. The terminal control 52 executes processing corresponding to the status signal 55 and at the same time displays the status indication on the display device in the I/O device 53. The display device in the I/O device 53 has an operator message area composed of, for example, a line of 80 characters at the lowest line position of the display picture. On this operator message area, the terminal control 52 displays the status indication of the terminal unit such as the data link status or an error message in order to interact with the operator.

Figure 3:
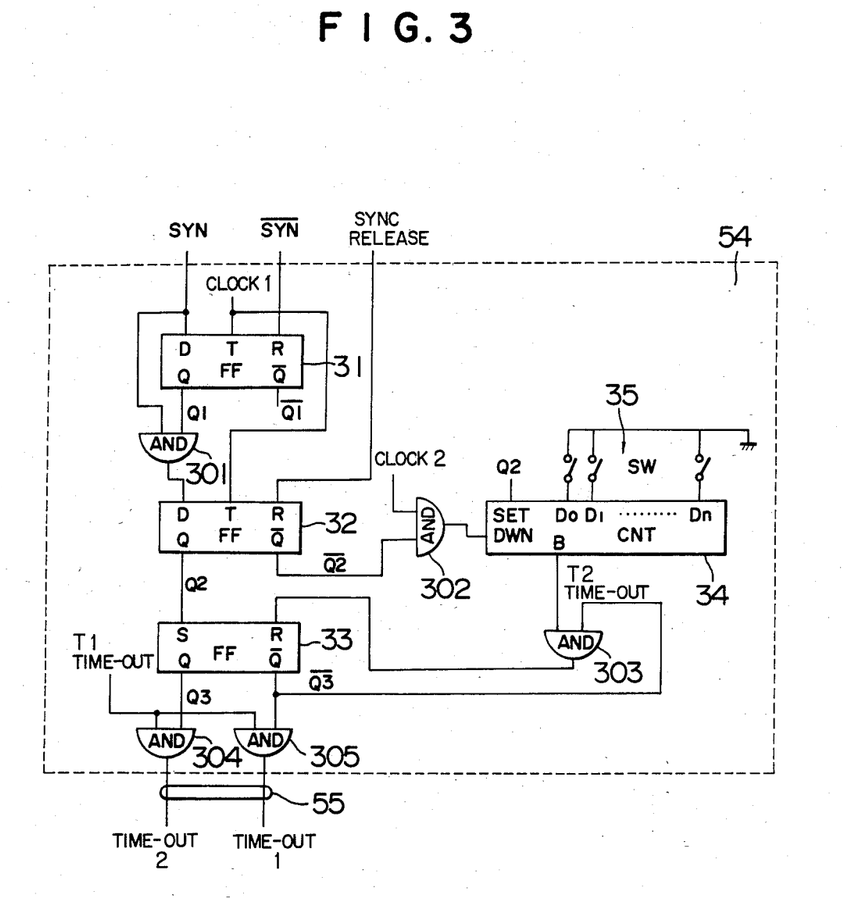
FIG. 3 shows an example of the circuit configuration of a status detector illustrated in FIG. 2.

FIG. 3 shows an example of a practical circuit of the status detector 54 illustrated in FIG. 2. Prior to describing the circuit, definitions of signals SYN, $\overline{SYN}$, clock 1, sync release, T1 time-out and clock 2 will be described. Some of these signals are already well known as the synchronous transmission control procedure and their definitions are based upon the procedure.

The SYN signal is a synchronization signal provided at the top of the data and control signal which is transmitted over the communication line. The SYN signal turns logical "1" when the SYN character has been received, and the SYN signal turns logical "0" when a character other than SYN has been received.

The $\overline{SYN}$ signal turns logical "1" when a character other than SYN has been received, and the $\overline{SYN}$ signal turns logical "0" when the SYN character has been received.

The clock 1 is a pulse signal having a cycle time which is as long as the duration of a character composed of one byte.

Figure 4:
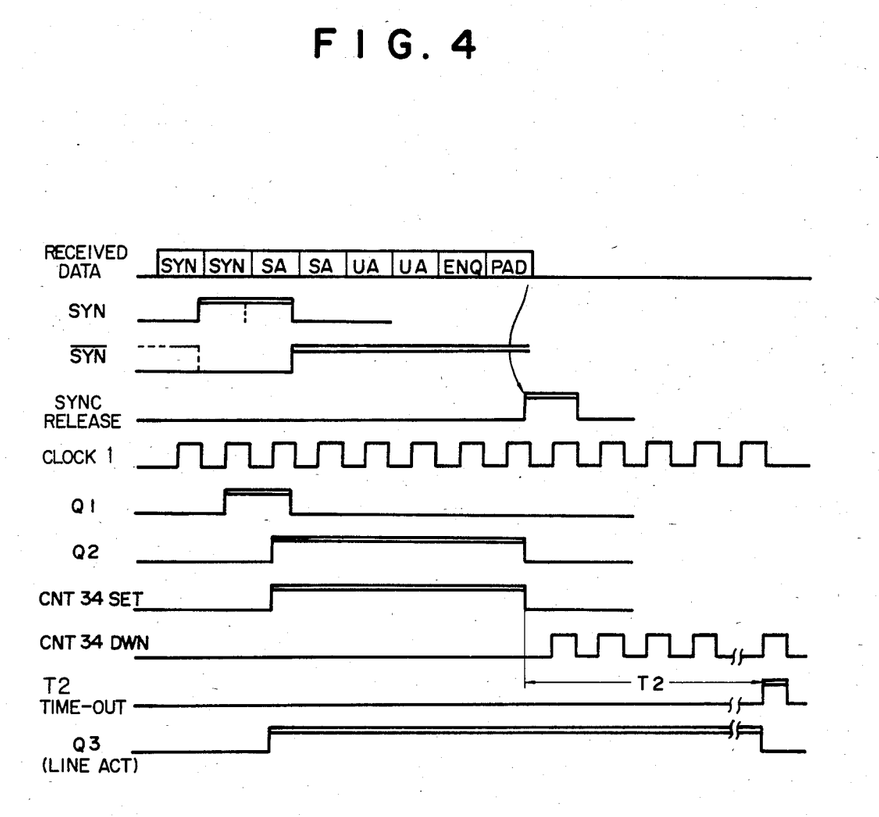
FIG. 4 is a timing diagram for illustrating the operation of the circuit shown in FIG. 3.

The syn release signal turns "1" for a prescribed time period when a character such as ENQ or EOT which is defined in the system as the sync release condition has been received. In this embodiment, the sync release signal turns "1" for a prescribed time when the ENQ has been received. Since characters are treated in units of 2 bytes according to the known synchronous transmission control procedure, a dummy character PAD of one byte is added preceding the ENQ for the purpose of providing a synchronization guard as shown in FIG. 4.

The T1 time-out signal turns logical "1" for a prescribed time when the data link for the station is not established within the time T1. The time-out may be incurred from the causes (1) to (6) as described before.

The clock 2 is a pulse signal for clocking.

Under the proposition as described above, the circuit illustrated in FIG. 3 will be described. The status detector 54 is provided in each terminal unit 5. As described before, the communication line 3 is composed of the receive data (RD) line for transmitting the control signal and data from the central computer 1 to each terminal unit 5 and the send data (SD) line for transmitting the information from each terminal unit 5 to the central computer 1. The information transmitted through the RD line, especially the signals SYN, $\overline{SYN}$ and ENQ within the control signal are effective in this status detector 54.

If a terminal unit 5, for instance, the terminal unit 5 of station A receives a polling or a selection request and a data link is established, the terminal unit 5 of station A monopolizes the RD line and the SD line. When data is exchanged through the RD line and the SD line between the terminal unit 5 of station A and the central computer 1, the text is transmitted with the above described control signals added thereto without fail. In addition, once a data link between the central computer 1 and the terminal unit 5 of station A has been established, exchange of the text between them is executed at least two or more times. Especially, the text and control signals transmitted over the RD line also reaches all terminal units 5 of other stations in addition to station A.

The present invention utilizes control signals such as SYN, $\overline{\text{SYN}}$ and ENQ transmitted over the RD line. In other words, it is discriminated from these control signals whether the line is busy due to a terminal unit 5 of some other station.

Referring now to FIG. 3, the synchronization signal SYN is fed to a data terminal D of a flip-flop (hereafter referred to as FF) 31 and an AND gate 301. The signal $\overline{\text{SYN}}$ is fed to a reset terminal R of the FF 31. The clock 1 signal described before is fed to trigger terminals T of the FF 31 and a FF 32. That is to say, the FF 31 is a flip-flop for detecting the SYN signal and $\overline{\text{SYN}}$ signal. A "1" side output Q1 of the FF 31 is fed to the FF 32 via the AND gate 301.

To a reset terminal R of the FF 32, the sync release signal obtained from the ENQ is fed. The FF 32 detects the width of the synchronization establishment. The "1" side output Q2 of the FF 32 is fed to a set terminal S of the FF 33 and a set terminal SET of a counter 34. The "0" side output $\overline{Q2}$ of the FF 32 is fed to DWN terminal of the counter 34. The clock 2 signal having a predetermined repetition period is also fed to an AND gate 302. The counter 34 counts the time duration during which nothing exists on the RD line. The counter 34 counts down every time $\overline{Q2}$ is fed thereto at the repetition period of the clock 2. When the signal Q2 is fed, i.e., when a signal is detected on the RD line, the counter 34 is set to its initial value.

The initial value of the counter 34 is preset by a switch 35. The initial value may also be set to be a value which is programmable. If the counter 34 counts down repeatedly to reach the value "0", in other words, if a signal is not detected on the RD line during the time period set by the switch 35, the T2 time-out signal is fed from the counter 34 to a reset terminal R of the FF 33 via an AND gate 303. The "0" side $\overline{Q3}$ of the FF 33 is also fed to the AND gate 303.

It can be said that the FF 33 determines whether the T1 time-out is made effective or not. The "1" side output Q3 of the FF 33 is fed to an AND gate 304, and the "0" side output $\overline{Q3}$ of the FF 33 is fed to an AND gate 305. The T1 time-out signal is also fed to AND gates 304 and 305. The output of the AND gate 304 becomes the time-out 2 signal and the output of the AND gate 305 becomes the time-out 1 signal.

The T1 time-out is brought about by the causes (1) to (6) as described before. When the FF 33 is set, in other words, when the terminal unit 5 of another station monopolizes the communication line and especially when a control signal exists on the RD line, the time-out 2 signal is obtained. Therefore, the time-out 2 signal is brought about mainly by the cause (5) or (6) described before.

If the T1 time-out signal is generated and in addition nothing exists on the RD line during the counting time T2 of the counter 34, the FF 33 is reset to send out the time-out 1 signal. This result may be roughly assumed to be brought about by a cause included in causes (1) to (4). And it is assumed that a line-down failure has occurred.

Referring to the time chart of FIG. 4 as well, the operation of the circuit illustrated in FIG. 3 will now be described.

Assuming now that the data link for the terminal unit 5 of the station A, for example, has been established and data exchange through the communication line 3 is under way, the text with control signals including SYN and ENQ appended is being transmitted over the RD line. These control signals are fed to the status controllers 54 within terminal units 5 of stations B and C which is different from the station A.

By a positive going edge of the clock 1 signal after the SYN signal has turned logical "1", the FF 31 is set. As a result, the Q1 output turns logical "1". When the $\overline{\text{SYN}}$ signal has turned logical "1", the Q1 signal turns logical "0". If the SYN signal is logical "1" while the Q1 signal is logical "1", the FF 32 is set by a next positive going edge of the clock 1 signal and thereby the Q2 output signal of the FF 32 turns logical "1". The Q2 output signal turns logical "0" when the sync release signal has turned logical "1". That is to say, from the time when two consecutive SYN characters were received until the time when the sync release character is received, the Q2 signal remains logical "1".

When the Q2 signal turns logical "1", the initial count value preset by the switch 35 is fed to terminals $D_o$ to $D_n$ of the counter 34 to be set into the counter 34. After the sync release character is received and thereby the $\overline{Q2}$ signal turns logical "1", pulses of the clock 2 signal are fed to the DWN terminal of the counter 34 to decrease the counted value of the counter 34 by one. When the counted value has reached "0", the T2 time-out signal which is the output of the counter 34 turns logical "1". When the Q2 signal turns logical "1", the Q3 output signal of the FF 33 also turns logical "1". This Q3 output signal turns logical "0" when the T2 time-out signal turns logical "1". That is to say, while the central computer 1 is sending a communication text to the terminal unit 5 of station A through the RD line with an interval which is shorter than T2, the Q3 signal is held at logical "1". If the central computer 1 sends a last communication text to the terminal unit 5 of station A through the RD line and thereafter no next communication text has been sent before the count value of the counter 34 reaches "0", i.e., before the time period T2 elapses, the T2 time-out signal is fed to the R terminal of the FF 33, the Q3 signal turning logical "0". The time period T2 is defined by the initial value in the counter 34 which is preset by the switch 35. It is desirable to preset the time period T2 nearly equal to the time period of the T1 time-out defined in the system, say, 30 to 60 seconds. Because it is often useless to preset the T2 time excessively longer than the T1 time-out time.

If the Q3 signal is logical "1" when the T1 time-out signal turns logical "1", the output of the AND gate 304 or the time-out 2 signal turns logical "1". If the Q3 signal is logical "0" when the T1 time-out signal turns logical "1", the timeout 1 signal turns logical "1". In case the time-out 1 has appeared, it may be determined that the station concerned as well as other stations are not communicating with the central computer 1. At this time, the status detector 54 displays the operator message "line down" on the display device through the terminal control 52. Since in this case the cause of T1 time-out is assumed to belong to, e.g., causes (1) to (4) described before, the operator is informed of the disposition to be executed. In case the time-out 2 signal has appeared, it may be determined that the central computer 1 is communicating with another station. At this time, the operator message "time-out" is displayed on the display device. Since in this case the cause of T2 time-out is assumed to belong to causes (5) and (6) described before, the operator is informed of the disposition to be executed.

Figure 5:
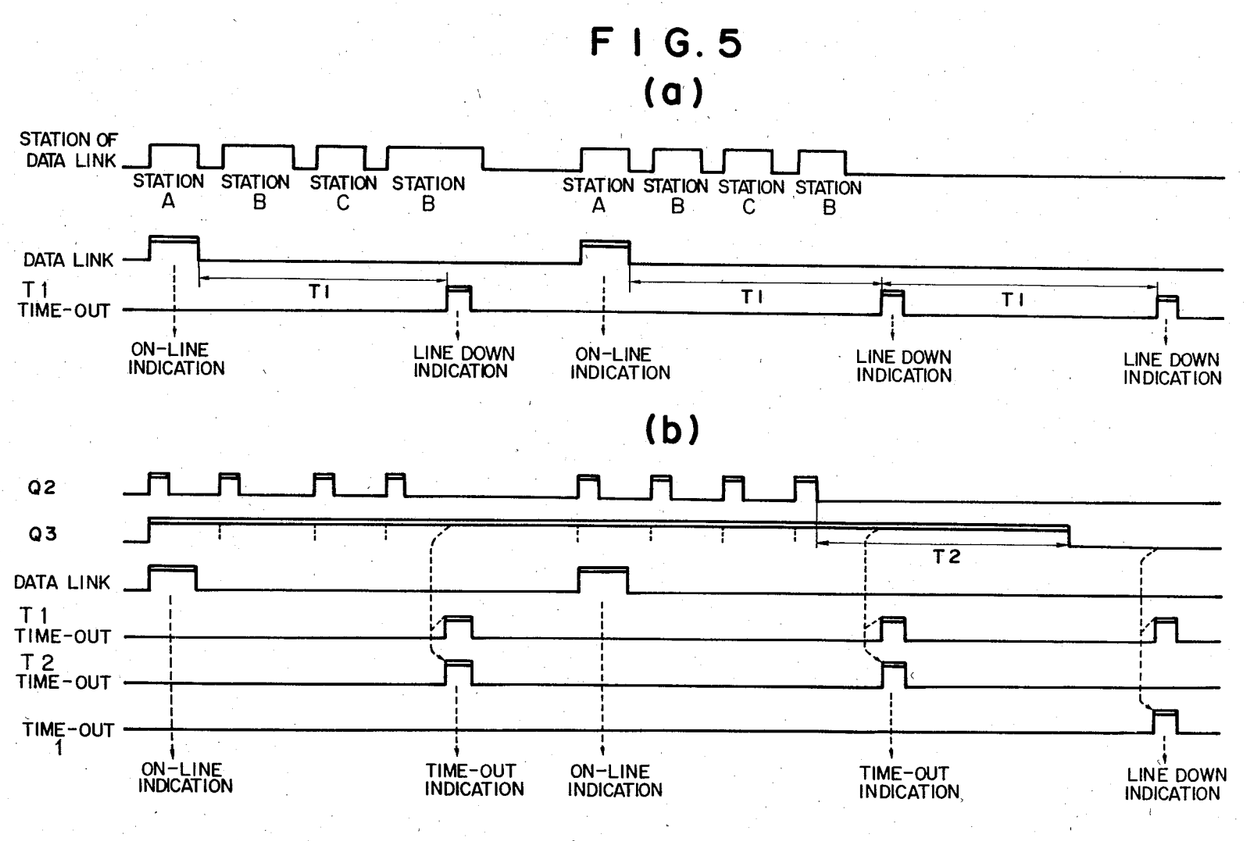

FIG. 5 shows time charts for facilitating comparison between the operation of the data communication system using the prior art and that in the embodiment of the present invention. FIG. 5(a) is a time chart for the prior art and FIG. 5(b) is a time chart for the embodiment of the present invention. In either case, the station concerned is the station A and the establishment of its data link brings about the on-line display. Should T1 time-out happen due to some of the aforementioned causes (1) to (6) in the prior art, the line-down indication is always displayed. Even though T1 time-out happens in this embodiment, only the timeout indication is displayed if the central computer 1 is communicating with another station and thereby the Q3 signal is logical "1". Only when T1 time-out happens after the Q3 signal turns logical "0" due to elapse of time T2, the line-down indication is displayed. In the same way as the prior art, the on-line indication is displayed on the occasion of data link establishment.

According to the embodiment as heretofore described, it may be determined whether the terminal unit of another station is communicating with the central computer via the communication line. When another station is in communication and the aforementioned cause (5) or (6) exists, it is not necessary to cancel the sending wait condition or the like and carry out maintenance or investigation in consideration of the communication path failure. And the scope of the maintenance and investigation on the occasion of a failure may be restricted to the aforementioned causes (1) to (4). It is possible to provide an on-line system with a high rate of operation.

In addition, the present invention is not restricted to the preferred embodiment described above and various modifications may be made therein.

For instance, the counter 34 may be a count up counter instead of a count down counter. In this case, the T2 time-out signal is sent out when the counter has counted up as far as a prescribed value.

It is desirable to start the counting operation in the counter 34 by using the sync release signal generated when there are substantially neither data nor control signals on the RD line. However, the SYN signal may also be used to start the counting operation. The interval between the SYN signal and the ENQ may vary according to the text length. In this case, therefore, it is necessary to select a larger initial value for the counter 34 considering the text length.

As another modification of the embodiment, it is also possible to replace the operation of not only the counter 34 but also the status detector 54 by a program.

I claim:

1. A data communication system including a high rank unit and a plurality of terminals connected in parallel to said high rank unit through the same communication line, for transmitting information through said communication line between said high rank unit and said terminals in accordance with a predetermined transmission control process in which a request is generated within a terminal to effect transmission of information on said communication line between the terminal and said high rank unit in response to a command inputted to the terminal and a first time-out signal is generated if the transmission of said information is not begun within a predetermined period following generation of said request, each of said terminals comprising:
    (a) detection means connected to receive signals on said communication line for detecting whether a data communication has been established between said high rank unit and any terminal in order to determine whether or not the communication line is in operation;
    (b) count means for carrying out a count operation with a predetermined timing following the generation of said request and when the result of detection of said detecting means indicates that said communication line is not in operation, and for generating a second time-out signal when a predetermined count is reached;
    (c) status signal generating means connected to said detection means and said count means for generating a first status signal representing a line busy condition when said detection means determines that the communication line is in operation at the time of generation of said first time-out signal and for generating a second status signal representing a maintenance request when said first and second time-out signals are both generated.

2. A data communication system according to claim 1, wherein said detection means includes means for detecting the beginning and completion of transmission of one logical data message being transmitted as information from a terminal to the high rank unit, said count means being responsive to said detection means so as to begin counting upon detection by the detection means of the completion of a transmission of one logical data message on the communication line, and to initialize said counting upon detection by the detection means of the beginning of transmission of one logical data message on the communication line.

3. A data communication system according to claim 1, wherein said detection means includes means for detecting specific control characters forming part of the head and end of one logical data message which is transmitted from the high rank unit to each of said terminals through said communication line, and wherein said count means includes means for controlling said count operation in response to detection by said detection means of said control characters.

4. A data communication system according to claim 3, wherein said count means is responsive to said detection means so that said counting is begun upon detection of a control character at the end of a logical data message and the counting is initialized upon detection of a control character at the head of a logical data message.

5. A method of time-out processing in a data communicating system including a high rank unit and a plurality of terminals connected in parallel to said high rank unit through the same communication line, for transmitting information through said communication line in accordance with a predetermined transmission control process in which a request is generated within a terminal to effect transmission of information on said communication line between the terminal and a high rank unit in response to a command inputted to the terminal and a first time-out signal is generated if the transmission of said information is not begun within a predetermined period following generation of said request, said method comprising the steps of:

(a) detecting specific transmission control characters forming part of the head and end of one logical data message transmitted as information from the high rank unit to each of the terminals on said communication line;

(b) carrying out a count operation with a predetermined timing following generation of said request and in response to detection of specific transmission control characters forming part of the head and end of one logical data message in the step (a) and generating a second time-out signal when a predetermined count is reached; and (c) generating a first status signal representing a line busy condition when said first time-out signal is generated following detection of a control character at the head and prior to detection of a control character at the end of a logical data message on said control line and generating a second status signal representing a maintenance request when said first and second time-out signals are both generated.

6. A method of time-out processing according to claim 5, wherein, when a specific transmission character forming part of the end of one logical data message is detected in said step (a), the counting in said step (b) is begun, and when a specific transmission control character which forms part of the head of a logical data message is detected, the counting in said step (b) is initialized.

* * * * *